United States Patent
Kan et al.

(10) Patent No.: US 7,622,694 B2
(45) Date of Patent: Nov. 24, 2009

(54) LASER BEAM MACHINE

(75) Inventors: Hirofumi Kan, Hamamatsu (JP);
Syunichi Gonda, Hamamatsu (JP);
Hirofumi Miyajima, Hamamatsu (JP);
Yujin Zheng, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/358,113

(22) Filed: Feb. 22, 2006

(65) Prior Publication Data
US 2006/0186095 A1  Aug. 24, 2006

(30) Foreign Application Priority Data
Feb. 23, 2005  (JP) ............................ P2005-047846

(51) Int. Cl.
*B23K 26/00* (2006.01)
(52) U.S. Cl. .............................. 219/121.63; 219/121.6; 219/121.65; 219/121.64; 219/121.66
(58) Field of Classification Search ............ 219/121.63, 219/121.6, 121.65, 121.77, 121.76, 121.64, 219/121.66, 121.85
See application file for complete search history.

(56) References Cited

U.S. PATENT DOCUMENTS

| | | | | |
|---|---|---|---|---|
| 5,612,251 A | * | 3/1997 | Lee | 438/795 |
| 5,824,023 A | * | 10/1998 | Anderson | 607/88 |
| 6,942,658 B1 | * | 9/2005 | Rizoiu et al. | 606/16 |
| 7,006,763 B2 | * | 2/2006 | Miller et al. | 392/420 |

FOREIGN PATENT DOCUMENTS

JP   06-106371   4/1994

* cited by examiner

*Primary Examiner*—M. Alexandra Elve
(74) *Attorney, Agent, or Firm*—Drinker Biddle & Reath LLP

(57) ABSTRACT

In this laser beam machine 1, while a pressing portion 9 of an optical guide member 6 presses a lid 13 against a body 12 of a container, the optical guide member 6 annularly guides a laser beam propagated through an optical fiber 4 and outputs it from the pressing portion 9. Thereby, an annular processing region of the body 12 and the lid 13 is entirely irradiated with the laser beam at one time and the lid 13 can be joined to the body 12, whereby improving the working efficiency. Such improvement in working efficiency shortens the processing time and improves the production yield. Furthermore, this laser beam machine 1 does not need to be separately provided with a rotating mechanism for laser beam scanning and a pressurizing mechanism for the body 12 and the lid 13, so that construction of the machine can be significantly simplified.

1 Claim, 4 Drawing Sheets

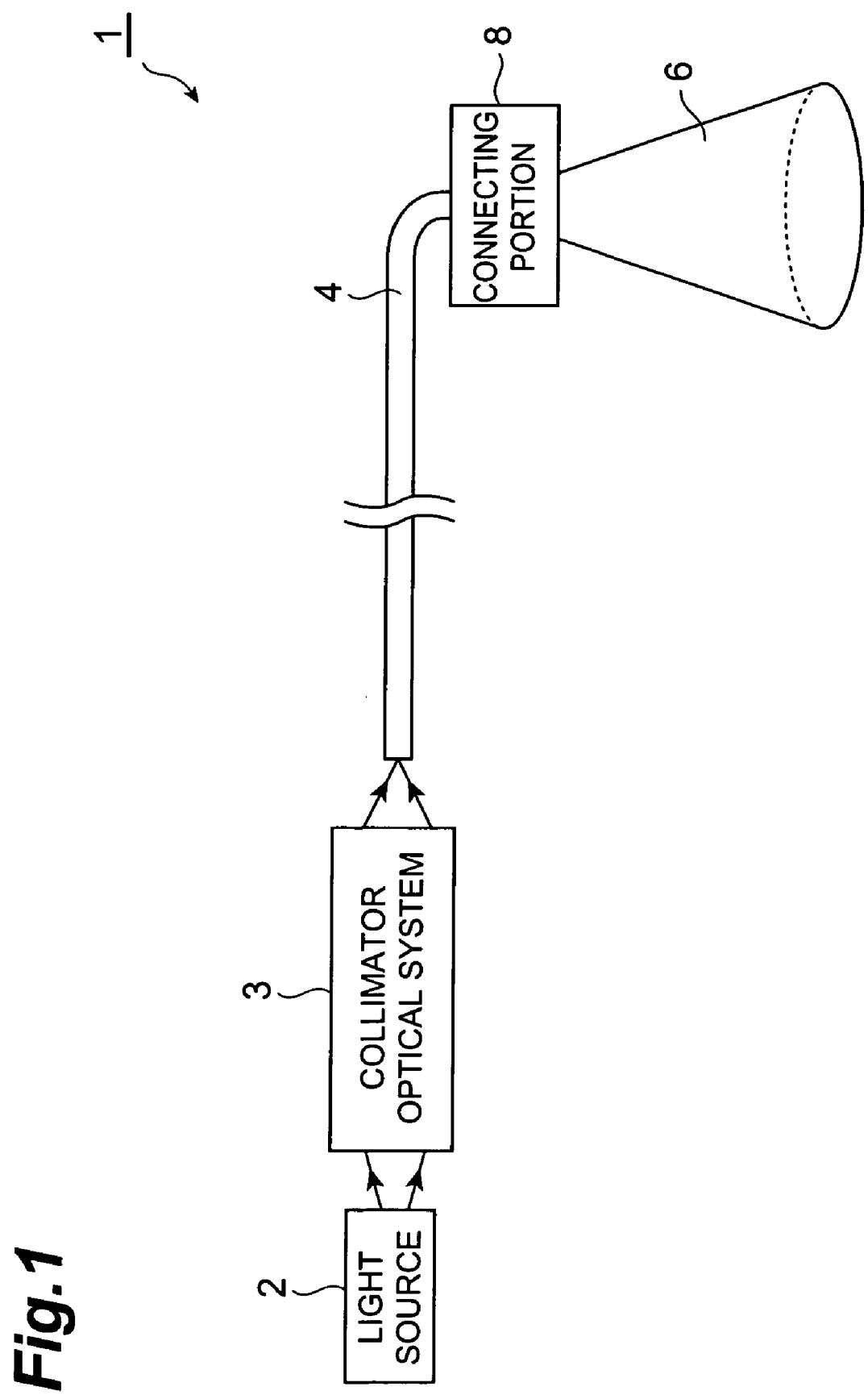

LASER BEAM MACHINE

BACKGROUND OF THE INVENTION

1. Field of the Invention

The present invention relates to a laser beam machine for joining a first workpiece material to a second workpiece material by irradiating a laser beam.

2. Related Background of the Invention

Conventionally, as a technique related to this kind of field, for example, a laser beam welding method is described in Japanese Published Unexamined Patent Application No. H06-106371. In this welding method, while pressurizing with a pressurizing roll, first and second workpiece materials (for example, a body and a lid in canning) overlapped with each other are rotated and welded by scanning a laser beam along the overlapping portion.

SUMMARY OF THE INVENTION

However, in the conventional welding method, it is necessary to scan a laser beam along the overlapping portion between the first and second workpiece materials, so that high working efficiency cannot be obtained. In addition, a pressurizing mechanism for the first and second workpiece materials and a rotating mechanism for scanning a laser beam are necessary, so that construction of the welding apparatus becomes complicated.

The invention was made to solve the problems, and an object thereof is to provide a laser beam machine which can efficiently join a first workpiece material to a second workpiece material by a simple construction.

To solve the problems, the laser beam machine relating to the invention joins a first workpiece material to a second workpiece material by irradiating a laser beam, comprising an optical fiber for propagating the laser beam, and an optical guide member that has a connecting portion to be optically connected to the optical fiber and a pressing portion to press the first workpiece material against the second workpiece material, and annularly guides the laser beam from the connecting portion to the pressing portion and outputs the laser beam from the pressing portion.

In this laser beam machine, while the pressing portion of the optical guide member presses the first workpiece material against the second workpiece material, a laser beam propagated through the optical fiber is annularly guided by the optical guide member and outputted from the pressing portion. Thereby, the entire annular processing region of the first and second workpiece materials is irradiated with the laser beam at one time, whereby the first workpiece material can be joined to the second workpiece material. This improves the working efficiency. Such improvement in working efficiency shortens the processing time and improves the production yield. Furthermore, this laser beam machine does not need to be separately provided with a rotating mechanism for laser beam scanning and a pressurizing mechanism for the first and second workpiece materials, so that construction of the machine can be significantly simplified.

It is preferable that a groove having a bottom from which the laser beam exits is annularly formed in the pressing portion. Thereby, the pressing portion can be separated from the processing region, so that the first workpiece material can be prevented from being welded to the optical guide member when it is joined. Thereby, the working efficiency for joining can be further improved.

It is preferable that the optical guide member is formed into a cap shape broaden toward the pressing portion from the connecting portion. With such a construction of the optical guide member, it can be easily and reliably realized that the first workpiece material is pressed against the second workpiece material and that a laser beam introduced from the optical fiber is annularly guided toward the pressing portion.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1 is a construction view of an embodiment of a laser beam machine according to the invention;

DESCRIPTION OF THE PREFERRED EMBODIMENTS

Figure 2A:
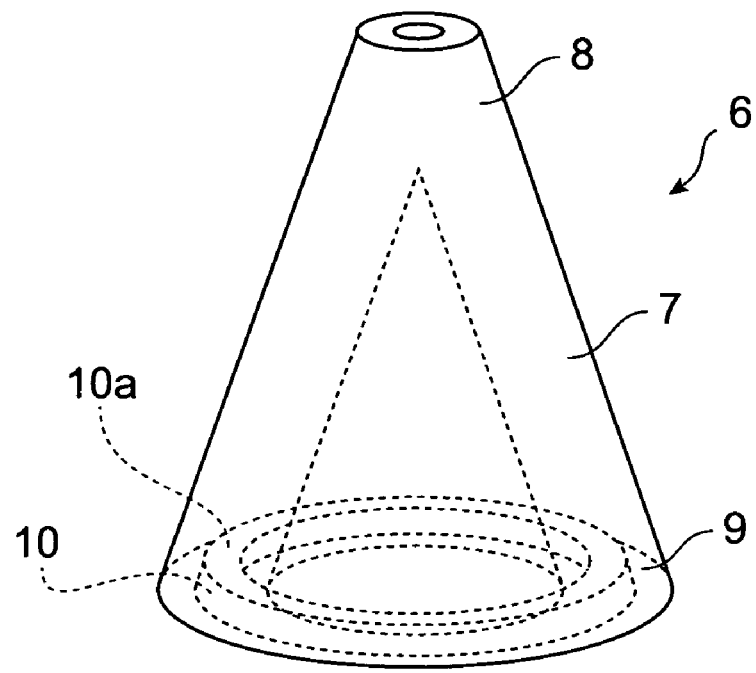
FIG. 2A is a perspective view of an optical guide member.

A preferred embodiment of the laser beam machine according to the invention is explained in detail with reference to the drawings.

FIG. 1 is a construction view of an embodiment of a laser beam machine constructed according to the invention. The laser beam machine 1 shown in FIG. 1 is constructed for joining a lid to a body of a container at a canning site. This laser beam machine 1 comprises a light source 2 that outputs a laser beam, a collimator optical system 3 that shapes the laser beam outputted from the light source 2, an optical fiber 4 that propagates the laser beam shaped by the collimator optical system 3, and an optical guide member 6 that outputs the laser beam propagated through the optical fiber 4 to a processing region.

As the light source 2, for example, a semiconductor laser array is used. A laser beam outputted at a predetermined power from this light source 2 is collimated and condensed by the collimator optical system 3, and coupled to the core of the optical fiber 4. Then, the laser beam propagates through the optical fiber 4, and then enters the optical guide member 6 in a circular beam pattern. The optical fiber 4 is not limited to a single optical fiber, but can be a bundle fiber including a plurality of optical fibers inside.

As shown in FIG. 2A, the optical guide member 6 is an optical component having a main body 7 made of quartz or boron crown glass. This optical guide member 6 has a connecting portion 8 to be optically connected to the optical fiber 4 by a mechanical contact via, for example, an optical connector, and has a pressing portion 9 that presses the lid of the container against its body. The optical guide member 6 is formed into a cap shape broadened toward the pressing portion 9 from the connecting portion 8. Herein, the optical guide member 6 has a hollow roughly headless circular cone shape that uses the connection portion 8 as an apex and uses the pressing portion 9 as a bottom, and has a height of approximately 100 millimeters and a diameter equal to or less than 1 millimeter at the connecting portion 8.

Figure 2B:
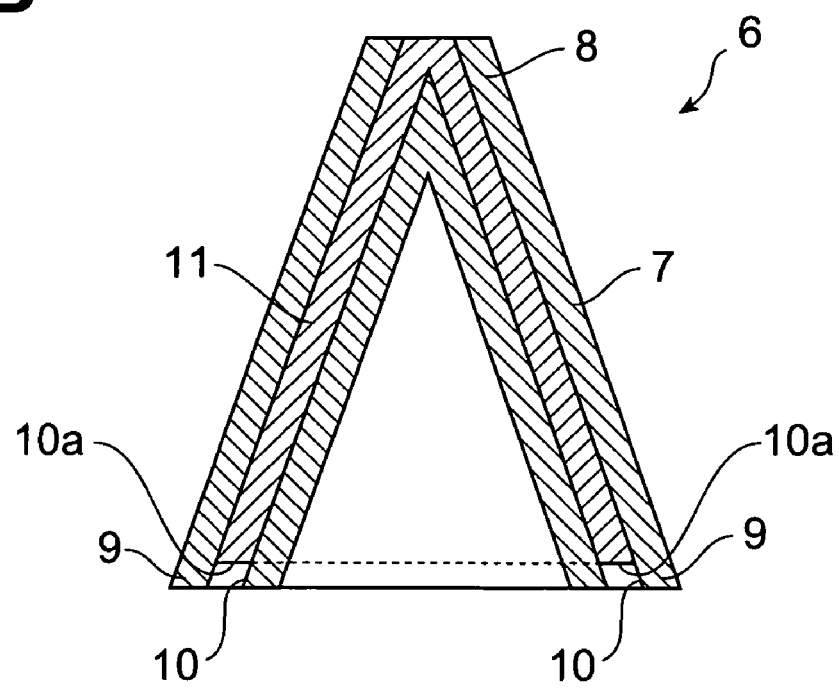
FIG. 2B is a longitudinal sectional view of the same.

As shown in FIG. 2B, in the optical guide member 6, an annular groove 10 is formed in the pressing portion 9, and inside the main body 7, a light guide portion 11 formed into a cap shape broadened to the end for connection to the bottom 10*a* of the groove 10 from the connecting portion 8 is formed. This light guide portion 11 is made of quartz doped with, for example, germanium, and has a refractive index higher than that of the main body 7. Therefore, a laser beam introduced from the optical fiber 4 via the connecting portion 8 is annularly guided inside the optical guide member 6 while being fully reflected inside the light guide portion 11, and annularly exits from the bottom 10*a* of the groove 10.

Next, a use example of this laser beam machine 1 is explained with reference to FIG. 3. In this example, joining of a circular lid 13 (first workpiece material) to a body 12 (second workpiece material) of a columnar can is illustrated.

Figure 3:
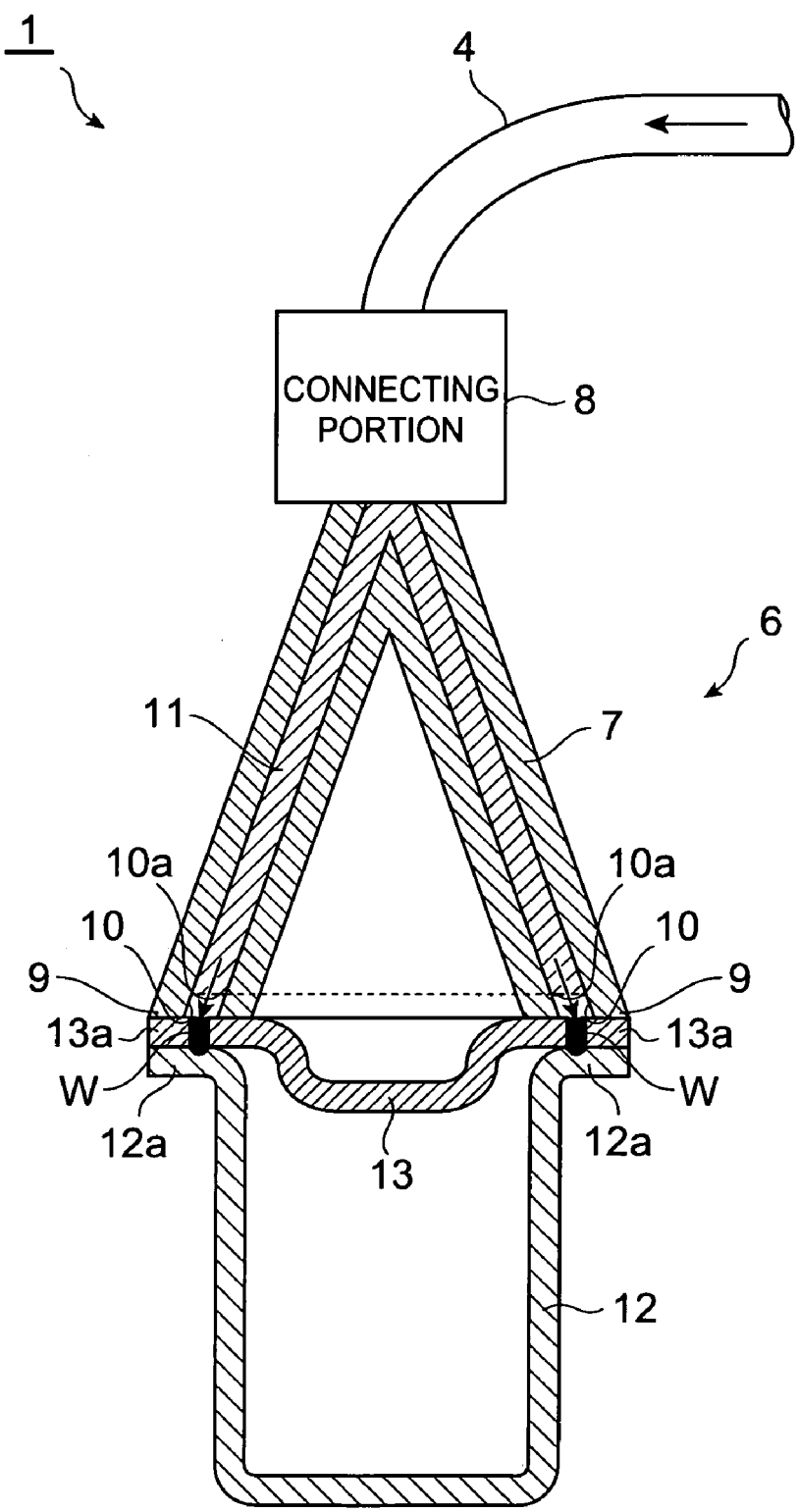
FIG. 3 is a main part sectional view of the laser beam machine shown in FIG. 1 in working order.

In this case, as shown in FIG. 3, first, the lid 13 is covered on the body 12 by overlapping a flange portion 12*a* of the body 12 and a flange portion 13*a* of the lid 13 with each other, and the optical guide member 6 is placed on the lid 13. At this time, due to the weight of the optical guide member 6 weighed on the pressing portion 9, the lid 13 is uniformly pressed against the body 12. Then, when the light source 2 is operated in this state, an annular laser beam that exits from the bottom 10*a* of the groove 10 of the optical guide member 6 forms an annular welding portion (processing region) W at the overlapping portion between the body 12 and the lid 13 positioned immediately under the groove 10. The body 12 and the lid 13 are joined to each other due to this welding portion W. This laser beam machine 1 can process various containers, in addition to the illustrated can, such as plastic bottles and bags for storing medicines in the same manner.

As described above, in the laser beam machine 1, while the pressing portion 9 of the optical guide member 6 presses the lid 13 against the body 12 of the container, a laser beam propagated through the optical fiber 4 is annularly guided by the optical guide member 6 and outputted from the pressing portion 9. Thereby, the entire annular processing region of the body 12 and the lid 13 is irradiated with the laser beam at one time and the lid 13 is joined to the body 12, whereby improving the working efficiency. Such improvement in working efficiency shortens the processing time and improves the production yield. Furthermore, this laser beam machine 1 does not need to be separately provided with a rotating mechanism for laser beam scanning and a pressurizing mechanism for the body 12 and the lid 13, so that construction of the machine can be significantly simplified. The optical guide member 6 is formed into a cap shape broadened toward the pressing portion 9 from the connecting portion 8, so that it can be easily and reliably realized that the lid 13 is pressed against the body 12 and a laser beam introduced from the optical fiber 4 is annularly guided toward the pressing portion 9.

Furthermore, in the pressing portion 9, a groove 10 having a bottom 10*a* from which a laser beam exits is annularly formed. Thus, by outputting a laser beam from the bottom 10*a* of the groove 10, the pressing portion 9 can be separated from the welding portion W as the processing region, so that the lid 13 can be prevented from being welded to the optical guide member 6 when it is joined. Thereby, the welding work can be smoothly performed.

The invention is not limited to the embodiment. For example, in the embodiment described above, a laser beam propagated through the optical fiber 4 is made incident on the optical guide member 6 in a roughly circular beam pattern. However, it is also possible that the laser beam is propagated in a cladding mode through the optical fiber 4 and made incident on the optical guide member 6 in an annular beam pattern. Such a beam pattern can be obtained by coupling a laser beam condensed by the collimator optical system 3 to the core of the optical fiber 4 at an angle greater than the NA (numerical aperture) of the optical fiber 4. For, connecting portion 8 between the optical fiber 4 and the optical guide member 6, without being limited to the mechanical contact via an optical connector, fusion connection can also be employed. In terms of simplicity of construction, the groove 10 and the light guide portion 11 of the pressing portion 9 are not necessarily formed in the optical guide member 6. In this case, the laser beam can be annularly guided toward the pressing portion 9 by using the main body 7 itself as an optical waveguide by means of full reflection using a refractive index difference from the air.

Figure 4A:
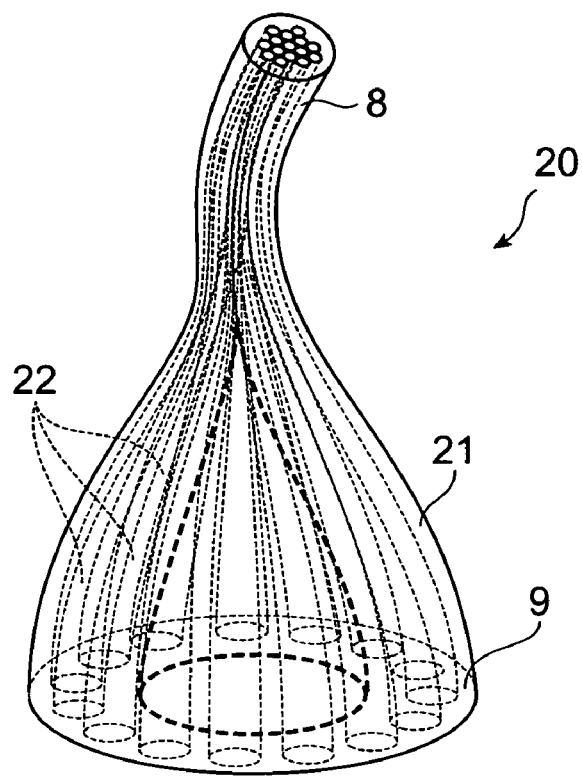
FIG. 4A is a perspective view of a modified example of the optical guide member.
Figure 4B:
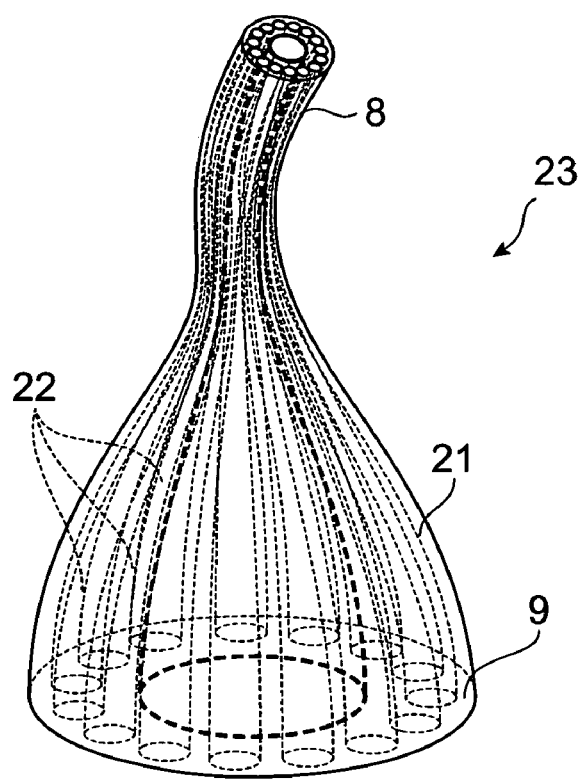
FIG. 4B is a perspective view of another modified example of the optical guide member.

Furthermore, as a modified example of the optical guide member, an FOP (fiber optical plate) can also be applied. For example, the optical guide member 20 shown in FIG. 4A has a clad 21 formed into a cap shape broadened toward the pressing portion 9 from the connecting portion 8 and a plurality (for example, fifteen) of cores 22 that are housed inside the clad 21 and are tapered so as to increase their thicknesses toward the pressing portion 9 from the connecting portion 8. The front ends of the respective cores 22 are circularly arranged on the pressing portion 9 side. In the optical guide member 23 shown in FIG. 4B, the front ends of the respective cores 22 are also circularly arranged on the connecting portion 8 side. Even by the optical guide members 20 and 23, the same effect as that of the optical guide member 6 shown in FIG. 2A and FIG. 2B is obtained. In particular, when a laser beam is outputted in an annular beam pattern from the optical fiber 4 by using the above-described cladding mode propagation, by applying the optical guide member 23 shown in FIG. 4B, further excellent optical coupling can be realized. The insides of the optical guide members 20 and 23 of the modified examples can be formed to be hollow, or filled with a glass material with extremely low optical transparency.

As described above, with the laser beam machine of the invention, a second workpiece material can be efficiently joined to a first workpiece material by a simple construction.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of following claims.

What is claimed is:

1. A laser beam machine for joining a first workpiece material to a second workpiece material by irradiating a laser beam, comprising:

an optical fiber for propagating the laser beam; and an optical guide member that has a connecting portion to be optically connected to the optical fiber and a pressing portion to press the first workpiece material against the second workpiece material, and annularly guides the laser beam from the connecting portion to the pressing portion and outputs the laser beam from the pressing portion, wherein the optical guide member has a hollow and roughly headless circular cone shape that utilizes the connection portion as an apex and utilizes the pressing portion as a bottom, and wherein the laser beam utilized for processing is an annular laser beam, wherein the above-described combination of features is specifically configured so that laser beam scanning is not necessary, wherein a groove having a bottom from which the laser beam exits is annularly formed in the pressing portion, wherein the optical guide member is formed into a cap shape broadened toward the pressing portion from the connecting portion, wherein the optical guide member comprises a main body and a light guide portion inside the main body, the light guide portion formed into a cap shape broadened to the end for connection to the bottom of the groove from the connection portion, the light guide portion having a refractive index higher than that of the main body, and wherein the first workpiece material is a lid and the second workpiece material is a body.

* * * * *